United States Patent
Minkin et al.

(10) Patent No.: US 7,346,227 B2
(45) Date of Patent: Mar. 18, 2008

(54) METHOD AND DEVICE FOR IMAGE TRANSFORMATION

(75) Inventors: Viktor Albertovich Minkin, Saint-Petersburg (RU); Alexandr Iliich Shtam, Saint-Petersburg (RU)

(73) Assignee: 000 "MP ELSYS", Saint-Petersburg (RU)

( * ) Notice: Subject to any disclaimer, the term of this patent is extended or adjusted under 35 U.S.C. 154(b) by 653 days.

(21) Appl. No.: 10/450,897

(22) PCT Filed: Dec. 14, 2001

(86) PCT No.: PCT/RU01/00545

§ 371 (c)(1),
(2), (4) Date: Feb. 20, 2004

(87) PCT Pub. No.: WO02/51154

PCT Pub. Date: Jun. 27, 2002

(65) Prior Publication Data

US 2004/0131275 A1 Jul. 8, 2004

(30) Foreign Application Priority Data

Dec. 19, 2000 (RU) ............................... 2000132334

(51) Int. Cl.
G06K 9/36 (2006.01)
H04N 7/18 (2006.01)
G06K 9/00 (2006.01)

(52) U.S. Cl. ..................... 382/276; 382/107; 382/118; 382/130; 382/181; 348/32; 348/77

(58) Field of Classification Search ................. 348/32, 348/77, 155, 430, 431, 699; 382/107, 109, 382/115, 118, 130, 181, 218, 219, 294, 307
See application file for complete search history.

(56) References Cited

U.S. PATENT DOCUMENTS 5,047,854 A 9/1991 Iwabuchi et al.

(Continued)

FOREIGN PATENT DOCUMENTS

| EP | 0474304 A2 | 3/1992 |
| EP | 0488721 A1 | 6/1992 |
| RU | 2068582 C1 | 10/1996 |
| RU | 2110900 C1 | 5/1998 |

OTHER PUBLICATIONS

IEEE, IEEE 100 : the authoritative dictionary of IEEE standard terms. 7th ed. 2000. p. 571.*

Primary Examiner—Samir Ahmed
Assistant Examiner—Michael A Newman
(74) Attorney, Agent, or Firm—Birch, Stewart, Kolasch & Birch, LLP

(57) ABSTRACT

Biometry for transforming, receiving, processing and analyzing electronic images of living biological objects is provided. The Biometry detects the objects, which produce insignificant periodical oscillations thereby making it possible to receive and analyze the images of the objects on a background of stationary and moving objects. Successive exposures of the object's image are received and picture-to-picture differences are evaluated, and a sum of differences of at least two successive exposures during the processing thereof is accumulated. The biometry comprises a photosensitive multielement transducer (1) and means for processing the images of the picture-to-picture difference which contain an exposure memory (2,3), a unit for evaluating the picture-to-picture difference (4), a picture-to-picture difference summator (5) and control registers (6). The device accumulates the sum of the exposure differences detected by the photosensitive multielement transducer.

6 Claims, 4 Drawing Sheets

U.S. PATENT DOCUMENTS

| | | | | |
|---|---|---|---|---|
| 5,579,045 | A | * | 11/1996 | Sekine et al. .......... 348/207.99 |
| 6,084,641 | A | * | 7/2000 | Wu ............................ 348/722 |
| 6,096,510 | A | * | 8/2000 | Hochman .................... 435/29 |
| 6,163,620 | A | * | 12/2000 | Hojnacki et al. ........... 382/162 |
| 6,233,368 | B1 | * | 5/2001 | Badyal et al. .............. 382/307 |
| 6,404,461 | B1 | * | 6/2002 | Le Clerc .................... 348/700 |
| 6,452,972 | B1 | * | 9/2002 | Ohara ................... 375/240.12 |
| 6,804,294 | B1 | * | 10/2004 | Hartung et al. ............. 375/240 |

* cited by examiner

METHOD AND DEVICE FOR IMAGE TRANSFORMATION

This application is the national phase under 35 U.S.C. § 371 of PCT International Application No. PCT/RU01/00545 which has an International filing date of Dec. 14, 2001, which designated the United States of America.

BACKGROUND OF THE INVENTION

1. Field of the Invention

The invention relates to the sphere of biometrics, medicine, psychology and can be used for transformation, capturing, processing and analysis of electronic images of live biological objects (VibraVision of VibraImage) performing vibrating displacements of various frequency and amplitude as well as can also be applied to inanimate objects performing periodic vibratory movements.

2. Description of the Related Art

A number of various applications are known, in which the frame difference is used for the image transformation and analysis as one of the main parameters carrying information about the object.

Many programs, video engineering algorithms, video effects, image transmission and image compression methods are based on fixation and addition of the frame difference to the image being already available [U.S. Pat. No. 5,047,854, EP 0465375]. These software or hardware tools normally allow to transmit and/or restore the required image quality with minimal costs during the transmission of information, however these tools are equally sensitive both to periodic and non-periodic displacement of animate or inanimate objects, which does not allow to reveal and obtain images of object performing insignificant displacement against a background of fixed or moving things.

Another trend of video observation of an object—the so-called movement detectors using the frame difference—is aimed at developing of security systems or observation systems registering certain changes occurring at the object [EP 0472806, EP 0492724, EP 0488721]. If a change at the object exceeds a certain value, i.e. the difference between two frames becomes greater that the threshold value, then the system will transfer into another operating mode, for example, fixing the image of a vehicle after the latter has exceeded the established speed threshold.

A method and a device for image transformation allowing to mark out and recognize a human face in a video frame sequence are well-known.

The method consists of obtaining sequential frames of the object image, subtraction between two sequential frames and subsequent processing of the frame difference. At the processing, those spots in the frame, which relate to the object movement, are marked by the binary unity whereas the rest spots are marked as binary zeros. Then the image is processed in a special way using special indications allowing to obtain the image of a human face (reveal it) against a background of other objects.

The device contains a photosensitive multielement converter, i.e. a module for subtracting two sequential frames and a module for subsequent processing of the frame difference as well as special modules for a complicated image convolution, which allow to reveal a human face against a background of other objects using special signs being inherent only to a human face.

The above-mentioned method and device [EP 0474304] have been taken as prototype. The prototype allows to reveal a moving human face against a background of other objects but it is distinguished by a hardware and software complexity; cannot be used for registration of other parts of the human body, for example, arms, legs; does not allow to derive images of other biological objects, for example, animals does not allow to reveal the image of a face, which movements are insignificant.

SUMMARY OF THE INVENTION

The method and the device of the present invention have an increased sensitivity to the detection of objects performing vibrations being insignificant, practically invisible with the naked eye, i.e. allow to solve a problem of detection, first of all, of animate objects, to which the given kinds of movements are inherent, which in turn allow to solve a problem of capturing and analysis of live object images against a background of both fixed and moving objects.

An object of the present invention is achieved by the fact that for a well-known object image transformation method including capturing of sequential object image frames, finding of the image frame differences, image processing and output of the image data; and the image processing includes accumulation of the sum of differences from not less than two selected sequential image frames.

In another aspect of the method according to the present invention, the processed image being output is modulated by a color scale; wherein, the pseudo-colored image is, at the output, superposed onto the real one.

In another aspect of the invention, the accumulation of the sum of differences of output signals for each element of sequential frames is carried out according to the following:

$$R_i = \frac{\sum_{1}^{M} |X_{i,k} - X_{i,k+1}|^L}{N} - D$$

where $R_i \geq 0$ is the resulting signal of the i-th element of the processed image data, which is taken equal to zero in case of obtaining a negative value of $R_i$ in the formula given above. Thus, $R_i=0$ for all $R_i \leq 0$;

$X_{i,k}$ is the real signal of i-th element in the frame with the number of k;

$X_{ik}+1$ is the real signal of i-th element in the frame with the number of k+1;

M is the number of frames being processed in the frame sequence;

L is the exponent coefficient of the process being revealed;

N is the averaging coefficient; and

D is the threshold value of the image noise level.

In another aspect of the image transformation method, processed images are used for obtaining information indicative of physiological or psychophysical conditions of a live object and, wherein, an image is obtained, an intensity of which is proportional to the variation of object parameters being studied.

The problem is solved the same as in the well-known object image transformation device including a photosensitive multielement converter and an interface difference processing module connected to the output unit for processed signals; the photosensitive multielement converter and the processing module being made on one crystal in the form of a CMOS image sensor; wherein the processing module is made such that it is capable to carry out accumulation of the sum of image frame differences obtained by the photosensitive multielement converter.

In the latter of the above-mentioned aspects of the method, it is taken into account that the image intensity is proportional to the variation of object parameters being studied.

In the image transformation device being proposed, the photosensitive multielement converter and the module of processing and accumulation of the frame difference is a CMOS image sensor.

It is well-known that a number of periodic processes are passing in any biological organism. The most known among them for man are periodic processes connected with the activity of heart (pulse rhythm) and breathing. It is possible to use a Doppler locator for registration of the above-mentioned processes [RU 2053706]. Both of these processes cause certain insignificant mechanical displacements of all parts of the body; wherein the body part displacement frequency includes vibrations coinciding with the frequency of the above-mentioned processes. However, even a television camera with a high spatial resolution and well-known image capturing methods cannot directly register these displacements, as they are too insignificant in space (fractions of a millimeter) and are stretched out in time.

The inventors have established experimentally that the use of television cameras with standard or high resolution and a relatively long accumulation of the frame difference allow to stably register periodic vibratory processes passing in a human body.

A probable explanation of the stability of images being revealed according to the proposed invention can be due to the following causes:

The frame difference accumulation forwards to the determination of vibration processes in the main. If a movement is not periodic, then it will not be accumulated and amplified for period of frame difference accumulation, however periodic movement will be amplified by such number of times as how many periods falls on the frame difference accumulation period.

In higher biological organisms, the process of periodic muscle contractions take place (shiver, tremor being studied by miagraphy, a muscle tissue science), which are sufficiently stable and depend upon the physiological and psychophysical conditions of the (human) body; wherein the average frequency of such human body vibrations equals to several hertz. As the muscle contraction process has a higher frequency than the pulse rhythm and breathing, it also makes a more considerable contribution into the image being registered.

Thus, a long (more than one second) accumulation of the frame difference allows to statistically register sufficiently small displacements of a biological organism, which is practically impossible to observe with the naked eye and which, as it was believed earlier, is impossible to observe by means of television equipment.

Let us consider a standard situation of capturing of a human hand by means of a television camera with a good objective and the high horizontal resolution of 600 TVL. At focusing on the hand, a full horizontal line will be equal to about 30 mm; consequently, the smallest displacement being normally registered will be equal to not less than 0.5 mm, but the accumulation of frame difference in accordance with the invention being proposed allows to stably register periodic displacements of the hand, which are five times as less, for example, 0.1 mm.

The quality of image being obtained mostly depends on the object being under control, upon the quality of television equipment being sued, contrast drops between objects and upon the shooting conditions. As also at the capturing of a normal television image, a certain parameters adjustment is needed for obtaining of a qualitative image according to the invention, which should be carried out taking in account of the following consideration:

The number M of frames being processed in the obtained frame sequence depends upon the frame difference accumulation time (which should be adequate for the registration of several cycles of periodic displacements) and upon the performance speed of the equipment being used. In addition, certainly M includes only that number of frames obtained, by which the frame difference is determined. If, for example, the total number of frames obtained in the sequence equals to 100 and each 10-th frame is processed, then it is evident that M will be equal to 10 rather than 100. If we want to observe the accumulated difference image of the object (hand) on the real-time basis, without account of the breathing influence, then one should take the accumulation time being approximately half of the normal breathing process period, i.e. approximately T=5 s. In this case, the number of frames will be determined by the digital image transmission rate and the performance speed of the frame difference capturing, which equals, for example, for P2-400 and the image size of 600×400 elements, to about 2 frames per second. Consequently, 10 frame differences will be found for 5 seconds, which is sufficient for restoration of a process with the period of about 1 second (pulse rhythm), as according to academician V. A. Kotelnikov ["Electrical measuring of not electrical values" prof. P. V. Novitski, Energy, Leningrad, 1975, p. 202] any time function with the spectrum being limited by the frequency of $f_c$, can be set on an interval of t by digital values in $n \geq 2 f_c \cdot t$ points. But if the performance speed of the frame difference capturing is inadequate, for example the processing is carried out on P-166 and equals to 0.5 frames per second, then only 2-3 difference additions will take place during 5 seconds, which is far from sufficient for the isolation of a process with the frequency of 1 Hz. In this case, one can increase the accumulation time (but then lower-frequency phenomena will also affect the process) or, nevertheless, use more speedy equipment for processing or refuse the process observation on the real-time basis.

N is the averaging coefficient, which should be introduced, if the difference signal sum exceeds the television signal.

The noise level threshold value of D is normally determined experimentally setting it so that the objects not performing periodic vibrations should become practically invisible, i.e. their $R_i$ signal (the resulting signal of the i-th element of the image processed) shall be $R_{i\ background} \leq 0$. If the value of $R_i$ is negative (the noise is greater than the frame difference being accumulated), then one should take $R_i=0$ at the image output and processing.

After setting of a certain value of D, a decrease of the output signal will practically occur, for example, at the output of a pseudo-colored image, the replacement of a part of the selected scale from 0 to the value of D with one color will take place.

The power index L (the rate coefficient of the process being revealed) is normally selected equal to 1 or 2, but, for better visualization of individual complicated vibratory processes or for reduction of the background influence, it can be taken equal to 3 or 4.

The output of the image being processed can be carried out both in the form of an image and in another form, for example, as a numerical coefficient equal to $R_i$ and carrying integral information about the new image being converted.

In order to more evidently release the output image from the images of objects performing large non-periodic displacements, at the output one should take into account the frame difference only in those image elements where it occurs repeatedly.

The modulation of the accumulated frame difference sum with a color scale at the output of a converted image in the form of an image, i.e. the transmission of the signal amplitude by a color spectrum scale, allows to contrastingly visualize those places in the image where the fluctuation amplitude is greater.

The authors use the term of a "pseudo-colored" image for the output processed image unlike a normal colored image being obtained from a television chamber, as the color in a processed image carries information about the magnitude (amplitude) of the frame difference sum.

One can use a monochrome or standard color scale for an output processed image corresponding, for example, to the visible light range from violet to infrared or another color scale with a random color transition; at that the range from zero to the threshold value of the noise level in the image should be represented by one color, for example, black or white. The use of a single color scale allows to easily and vividly compare images obtained in identical conditions.

The implementation of proposed methods can be carried out using a standard television camera and a standard processing device (for example, a PC) by means of software performing calculation and visualization of the frame difference.

The device being proposed consists of a photosensitive multielement sensor and a processing device on one crystal of a CMOS device, which allows to considerably enhance the performance speed at the frame difference calculation and, accordingly, achieve a significantly higher sensitivity to the detection of vibrations. A normal image sensor on CMOS converting an image into an analogue or digital television signal can contain means for the capturing of an frame difference signal; however up to the present time there have been no necessity and need in the implementation of similar CMOS image sensors.

The means of obtaining of an frame difference signal on a CMOS image sensor can be by both hardware and software, as the modern technology of CMOS device manufacture allows to solve practically any signal processing problems and, consequently, to accumulate the frame difference directly on the crystal. The device being proposed according to this invention differs from a normal CMOS image sensor in that at its operation the output signal is proportional to the intensity of vibrations of the object rather than irradiated light from the object.

It should be noted that fixed objects become invisible at the transformation of images in accordance with the proposed method, as it was reflected in FIG. 2a and FIG. 2b given herein. On the other hand, practically no one live object can become invisible at a long accumulation of the frame difference, whatever a man (or an animal) should try to "stand still," it cannot stop the vibration processes passing in its organism. This property of the invention being proposed can be used in various guarding and security systems for the protection against fakes by means of division of animate and inanimate objects, for example, it is possible to reveal faked fingerprint information media in dactyloscopy by means of the proposed invention.

The use of the device and method being proposed can allow to solve various practical problems. For example, investigations being conducted by the inventors have established that the human image being obtained according to the proposed invention essentially depends upon its nervous and psychological conditions. The saturation of the image of a man being in the nervous excitation state, under the influence of alcohol or drugs, is considerably higher (i.e. the vibration intensity is higher) than with a man being in a quiet conditions, and, consequently, the image being obtained can be used for the detection of persons suffering from alcoholism, drug addiction, nervous and/or other diseases as well as a contact-free "lie-detector".

DETAILED DESCRIPTION OF THE INVENTION

Figure 1:
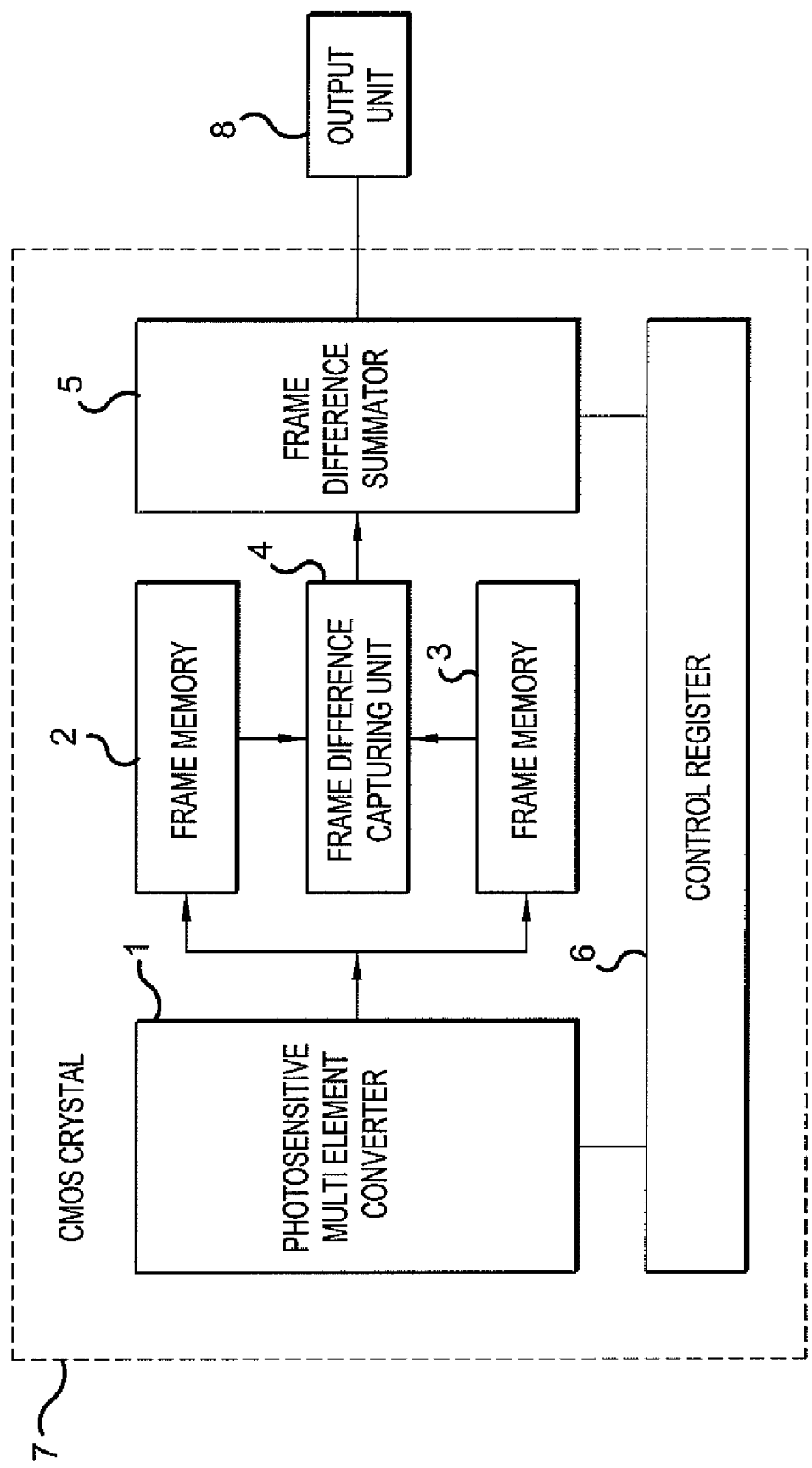
FIG. 1 shows a version of the structural diagram for the proposed device.

The proposed device includes the following main components: photosensitive multielement converter 1; frame memory 2, 3; frame difference capturing unit 4, frame difference summator 5, control registers 6 located on a single CMOS crystal 7 and output unit 8 for outputting the processed signal.

An operation of the device is carried out as follows. An optical image of an object being projected on the multielement photosensitive converter 1 is converted by it into an electrical signal, which under the control of registers 6 is read out frame-by-frame in turn into the frame memory units 2 and 3. From the frame memory units, the frame signals synchronized up to the image elements are supplied to the frame difference capturing unit 4, the signals from which is fed to the frame difference summator where the frame difference accumulation (summation) occurs up to the moment of obtaining of a starting signal from the control register. Upon reception of the starting signal, an output converted signal is transmitted to the processed signal output unit 8, where it is displayed, for example, in the form of a pseudo-colored image of the object is performed.

It is natural that the design of the proposed device is not limited by the structural diagram given above. It is possible to create the suggested device with the use of logical solutions following from the existing engineering level, for example, use of horizontal memory in units 2 and 3 rather than frame memory, original signal digitalization, etc.

Let us give an example of a specific implementation of the invention at the capturing of the frame difference sum of human hand images (new image) based on a sequence of television frames of the (old) image.

As a television camera, let us use a color digital television camera of AverCam type with a CMOS element and an output signal being supplied to the USB computer port. In order to implement the proposed method, it is also possible to use a black and white television camera, as an integral brightness signal is normally used for the capturing of frame difference, though one can find a difference in any single field from RGB signals.

Figure 2A:
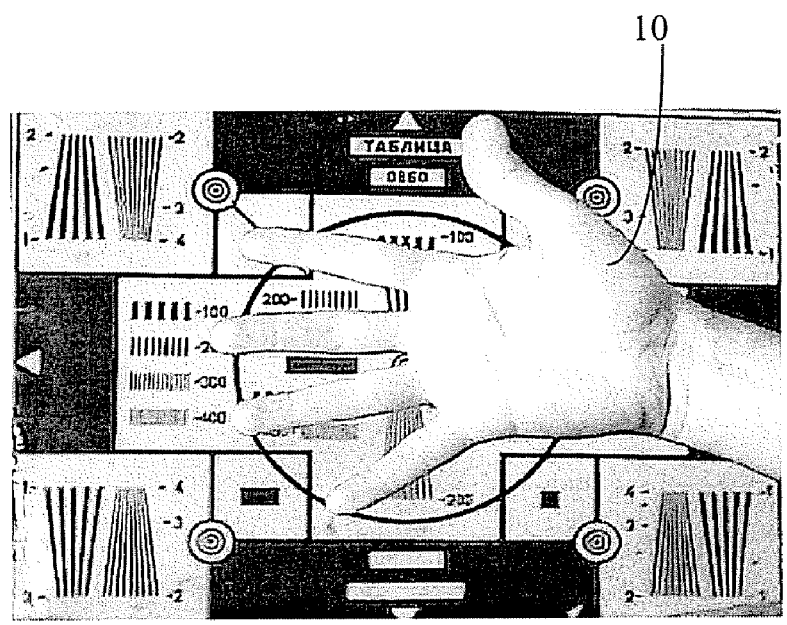
FIG. 2a shows a normal image of a human hand against a background of a television test table representing one frame in the frame sequence being obtained.
Figure 2B:
FIG. 2b shows the human hand vibration image (VibraImage) being converted from the frame sequence obtained according to the proposed invention and being a frame in the converted frame sequence.

The operating mode with 600×400 image elements shall be selected for the television camera. As a result, an image is obtained consisting of sequential hand frames against a background of the television "test table", which is transmitted via the USB port to the computer, which will visualize the given picture on the monitor screen. Then the calculation and accumulation of frame difference is carried out according to the program developed by the inventors in accordance with the present invention as well as both new and old images are displayed on the computer screen in the mode of several frames per second. The old and new images of a human hand 10 are given in FIGS. 2a and 2b, respectively. The illumination at the object was 300 1×. The following parameters were given in the program: M=10; L=1; N=1: D=20.

Figure 3:
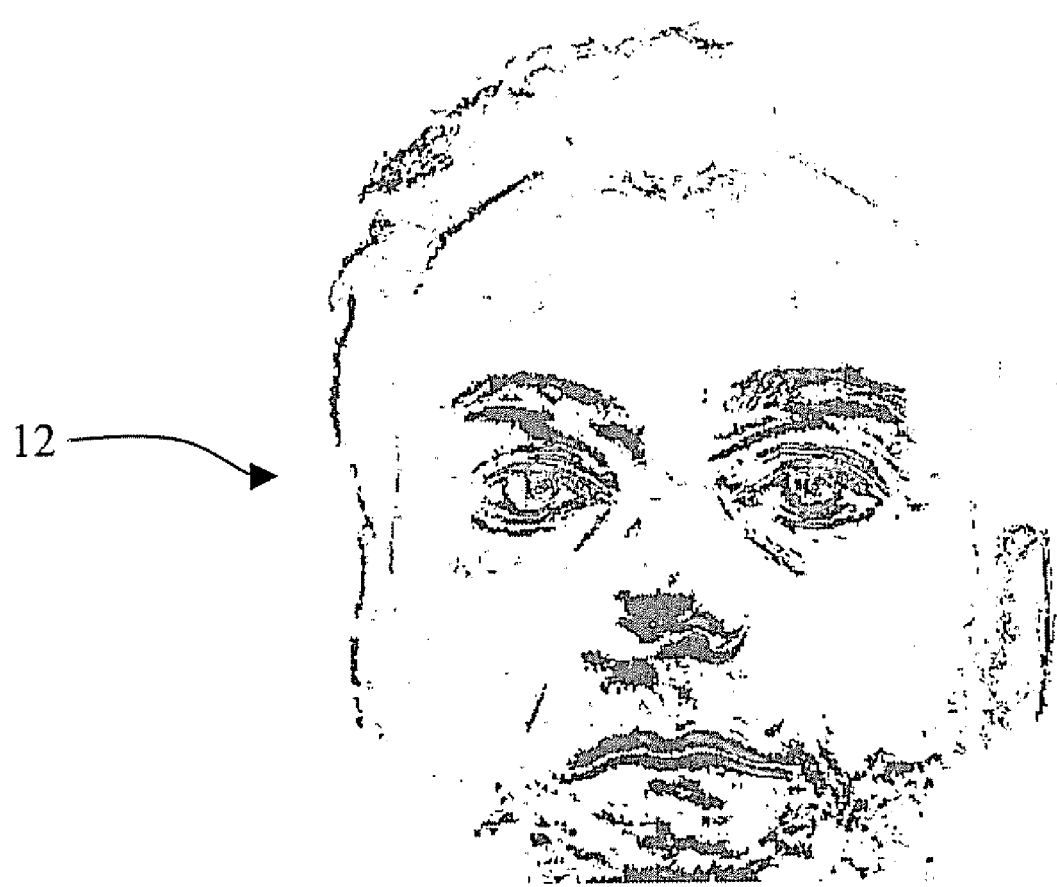
FIG. 3 shows the transformation of the frame sequence obtained into a pseudo-colored vibration image (VibraImage) of the human face.
Figure 4:
FIG. 4 shows the frame difference processing image superimposed onto the real image, like aura.

At the change of program settings, the output of converted (new) image is carried out in the following modes:
a) pseudo-colored—with the output of only an image 12 of frame difference accumulated in the form of an image, which amplitude is modulated by the color scale (FIG. 3);
b) monochromatic—with the output of only the image of frame difference accumulated; at that the magnitude of the sum of each image element obtained is proportional to the monochromatic color intensity. The color may generally be random, however the inventors preferred the selection of the grey color for the monochromatic mode.
c) pseudo-colored—with the superposition of an image 14 obtained at the frame difference processing onto a real image 16 (FIG. 4).

Each of the image output modes being used has its own advantages. The pseudo-colored mode allows to obtain a new converted image in the brightest and most contrasting form and is applicable for the registration of a little visible change.

The monochromatic mode is most of all suitable for measurements and allows to register significant vibrations.

The pseudo-colored mode with superimposition does not require outputting of the second normal picture on the screen, which can be convenient at the adjustment for the object.

At the change of the M parameter, the following changes occur in the new image picture being observed. At decreasing M≦5, the intact hand contour breaks and the image remains only in individual, brighter spots. If at M≦5, the threshold value of the image noise level is decreased, then the hand contour image will be restored but in this case visible disturbances will appear over the whole image, which brightness will be comparable with the hand image as well as fixed things will begin to "develop".

At the increase of M≧20, the increase and accumulation of the noise level will occur accordingly; at that, due to the influence of other low-frequency processes (breathing, low-frequency muscle displacements), the hand image is smeared and becomes less contrasting even at the increase of threshold level being adjusted for the image noise elimination.

The inventors have established that the intensity of the human image being obtained according to the invention is a constant magnitude in the normal still situation, of course, under its observation in the fixed conditions. At a variation of the man's situation: temperature rise in case of a disease, the intensity of the new image being obtained grows. The new image intensity will also grow after taking alcohol drinks. On the other hand, after taking of some anti-anxiety drugs braking the live activity of the organism, the image intensity decrease was observed.

It was established that there is no dependence of the new image data quality upon the image upgrading frequency, i.e. its visualization after the whole sampling or each processed difference. The increase or decrease of the number of processed frames may lead to the deformation of the new image quality corresponding respectively to the under-exposure or over-exposure during normal shooting. The number of frames in the sample and the number of frames being processed (i.e. frames, by which the difference is determined) can differ, as a certain time is needed for processing, and the less this difference is the better the sensitivity can be.

The experiments conducted have shown a possibility of capturing of fundamentally new photo and video images by the proposed method and device (extremely reminding the image of old aura or irradiance) of higher animate organisms (of man, dog, etc.) reflecting certain parameters of the organism, which studying and use can give new possibilities for medicine and biometrics. The given invention is not limited by a possibility of the capturing of images for only animate objects, and it can also be used for the detection of other vibration processes, for example, the 25-th frame technology or mechanically vibrating means.

The invention claimed is:

1. An object image transformation method, comprising:
capturing consecutive frames of the object's image, the consecutive frames including a number of elements;
determining a frame difference for each of said elements; and
processing the captured image and outputting an image data,
wherein the image processing includes a sum accumulation of the frame difference for each of said elements from no less than two consecutive image frames,
wherein the accumulation of the sum of the frame difference for each element of consecutive frames is carried out according to the following formula:

$$R_i = \frac{\sum_1^M |X_{i,k} - X_{i,k+1}|^L}{N} - D$$

where $R_i \geq 0$- is the resulting signal of the i-th element of the processed image, which is taken equal to zero in case of obtaining a negative value in the formula;
$X_{i,k}$- is the real signal of i-th element in the frame with the number of k;
$X_{i,k+1}$- is the real signal of i-th element in the frame with the number of k+1;
M - is the number of frames being processed in the frame sequence;
L - is the rate coefficient of the process being revealed;
N - is the averaging coefficient
D - is the threshold value of the image noise level.

2. The method of claim 1, wherein the output of the image data is obtained by modulating the accumulative sum of the frame difference with a color scale.

3. The method of claim 2, wherein at the output of the pseudo-colored image data, said the pseudo-colored image is superposed onto the real image.

4. The method of claim 1, wherein the captured image is used for obtaining information about the physiological or psychophysical condition of a live object.

5. The method of claim 4, wherein the intensity of the image obtained at processing is proportional to the change in object parameters being studied.

6. An object image transformation apparatus, comprising:
   means for capturing consecutive frames of the objects image, the consecutive frames including a number of elements;
   means for determining a frame difference for each said elements; and
   means for processing the captured image and outputting an image data, wherein the image processing includes a sum accumulation of the frame difference for each of said elements from no less than two consecutive image frames,
   wherein the accumulation of the sum of the frame difference for each element of consecutive frames is carried out according to the following formula:

$$R_i = \frac{\sum_{1}^{M} |X_{i,k} - X_{i,k+1}|^L}{N} - D$$

where $R_i \geq 0$—is the resulting signal of the i-th element of the processed image, which is taken equal to zero in case of obtaining a negative value in the formula;
   $X_{i,k}$—is the real signal of the i-th element in the frame with the number k;
   $X_{i,k+1}$—is the real signal of the i-th element in the frame with the number k+1;
   M—is the number of frames being processed in the frame sequence;
   L—is the rate coefficient of the process being revealed;
   N—is the averaging coefficient;
   D—is the threshold value of the image noise level.

* * * * *